US008682956B2

(12) United States Patent
Bai et al.

(10) Patent No.: US 8,682,956 B2
(45) Date of Patent: Mar. 25, 2014

(54) SYSTEMS AND METHODS FOR DETERMINING RECOMMENDED MEDIA CONTENT FOR EXCHANGE BETWEEN VEHICLES

(75) Inventors: Fan Bai, Ann Arbor, MI (US); Donald K. Grimm, Utica, MI (US)

(73) Assignee: GM Global Technology Operations, Inc, Detroit, MI (US)

( * ) Notice: Subject to any disclaimer, the term of this patent is extended or adjusted under 35 U.S.C. 154(b) by 291 days.

(21) Appl. No.: 13/156,381

(22) Filed: Jun. 9, 2011

(65) Prior Publication Data

US 2012/0317161 A1 Dec. 13, 2012

(51) Int. Cl.
G06F 15/16 (2006.01)
(52) U.S. Cl.
USPC .......................................... 709/201; 709/203
(58) Field of Classification Search
USPC ........................................................ 709/201
See application file for complete search history.

(56) References Cited

U.S. PATENT DOCUMENTS

| 4,979,170 | A | * | 12/1990 | Gilhousen et al. | ............ 370/321 |
| 6,727,914 | B1 | | 4/2004 | Gutta | |
| 7,027,602 | B2 | | 4/2006 | Goodman et al. | |
| 2002/0162101 | A1 | | 10/2002 | Gutta et al. | |
| 2003/0037144 | A1 | | 2/2003 | Pestoni et al. | |
| 2005/0033505 | A1 | * | 2/2005 | Zatz | .............................. 701/117 |
| 2005/0132024 | A1 | | 6/2005 | Habaguchi et al. | |
| 2008/0109843 | A1 | * | 5/2008 | Ullah | ............................... 725/34 |
| 2008/0134043 | A1 | | 6/2008 | Georgis et al. | |
| 2008/0156173 | A1 | | 7/2008 | Bauer | |
| 2008/0244634 | A1 | | 10/2008 | Van Doorn et al. | |
| 2009/0006542 | A1 | * | 1/2009 | Feldman et al. | ............... 709/203 |
| 2009/0075624 | A1 | | 3/2009 | Cox et al. | |
| 2009/0112689 | A1 | | 4/2009 | Peterson et al. | |
| 2009/0164429 | A1 | | 6/2009 | Svendsen et al. | |
| 2009/0170434 | A1 | * | 7/2009 | Tengler et al. | ................ 455/41.2 |
| 2009/0182498 | A1 | | 7/2009 | Seymour | |
| 2009/0285175 | A1 | * | 11/2009 | Nix | ............... 370/331 |
| 2009/0307168 | A1 | | 12/2009 | Bockius et al. | |
| 2012/0263144 | A1 | * | 10/2012 | Nix | ............................... 370/331 |
| 2012/0317161 | A1 | * | 12/2012 | Bai et al. | ........................ 709/201 |

OTHER PUBLICATIONS

Fischer et al., "Adaptive and Multimodal Interaction in the Vehicle", Systems, Man and Cybernetics, IEEE International Conference on Oct. 12-15, 2008, pp. 1512-1516.
Fischer et al., "Adaptive Personalization of Multimodal Vehicular Interfaces Using a Hybrid Recommendation Approach with Fussy Preferences", Intelligent Vehicles Symposium IEEE, Jun. 4-6, 2008, pp. 209-213.
Yu et al., "An Adaptive In-Vehicle Multimedia Recommender for Group Users", Vehicular Technology Conference IEEE 61th, vol. 5, May 30-Jun. 1, 2005.

* cited by examiner

Primary Examiner — Gerald Smarth
(74) Attorney, Agent, or Firm — Parks IP Law LLC

(57) ABSTRACT

An onboard computer system including instructions causing a processor to store a first-user media profile indicating media preferences of a user. The processor also determines that the vehicle is encountering a second vehicle and receives a second-user media profile. The processor also evaluates the profiles to determine whether the profiles bear a predetermined similarity and, in response to determining the similarity exists, identifies recommended media, based on characteristics of the profiles, and initiates provision of the recommended media to one of the users of the first vehicle and the user of the second vehicle.

19 Claims, 6 Drawing Sheets ding recommended infotainment to a vehicle user based on per-
SYSTEMS AND METHODS FOR DETERMINING RECOMMENDED MEDIA CONTENT FOR EXCHANGE BETWEEN VEHICLES

TECHNICAL FIELD

The present disclosure relates generally to systems and methods for recommending media content to a user of a vehicle and, more particularly, to systems and methods for recommending infotainment to a vehicle user based on personal user characteristics exchanged between vehicles.

BACKGROUND

Modern automobiles include on-board computers controlling select vehicle functions and providing the vehicle and driver with various types of information. For example, on-board computers control engine, security, and some suspension functions, and facilitate communications with other vehicles and remote driver-assistance centers. As an example of such driver-assistance, the OnStar® system provides services including in-vehicle safety and security, hands-free calling, turn-by-turn navigation, and remote-diagnostics.

On-board computers also facilitate delivery to the driver of information and entertainment, which are referred to collectively herein as infotainment. Infotainment can include, for example, data related to news, weather, sports, music, and notifications about vehicle location and nearby traffic. Infotainment can be delivered in any of a wide variety of forms, including text, video, audio, and combinations of these.

Vehicle users presently select media content they wish to experience in various ways including by choosing a radio channel or compact disc to play. While vehicle users can manually select media content in these ways, the present inventors have determined that vehicle users would benefit from receiving infotainment and other media content that is customized for the vehicle user. Such custom media content could, according to the present technology, include media content identified based on media profiles of users of vehicles nearby the user's vehicle, and media content that the vehicle user has not been previously exposed to.

SUMMARY

The present disclosure relates to an onboard computer system, for use in a first vehicle to determine recommended media. The onboard computer system includes a computer processor, a receiver, and a transmitter. The onboard computer system also includes a tangible computer-readable storage medium. The storage medium stores instructions that, when executed by the processor, cause the processor to perform various acts. The acts include storing a first-user media profile indicating media preferences of a user of the first vehicle.

The acts also include determining that the first vehicle is encountering a second vehicle based on signals received by way of the receiver. The acts further include receiving a second-user media profile from the second vehicle by way of the receiver, the second-user media profile being indicative of media preferences of a user of the second vehicle. The acts also include evaluating the first-user media profile and the second-user media profile to determine whether the first-user media profile and the second-user media profile bear a predetermined level of similarity to each other. The acts further include, in response to determining that the first-user media profile and the second-user media profile have the predetermined similarity: identify the recommended media based on characteristics of the first-user media profile and characteristics of the second-user media profile, and initiate provision of the recommended media, from the onboard computer system to one of the user of the first vehicle and the user of the second vehicle.

The present disclosure also relates to a computer-implemented method for recommending information to a user of a vehicle. The method includes an onboard computer of a first vehicle storing a first-user media profile in a storage medium of the first vehicle, the first-user media profile indicating media preferences of a user of the first vehicle. The method also includes the onboard computer of the first vehicle determining that the first vehicle is encountering a second vehicle based on signals received by way of the receiver. The method further includes the onboard computer of the first vehicle receiving a second-user media profile from the second vehicle by way of the receiver, the second-user media profile being indicative of media preferences of a user of the second vehicle.

The method yet further includes evaluating the first-user media profile and the second-user media profile to determine whether the first-user media profile and the second-user media profile bear at least a predetermined level of similarity to each other. The method still further includes, in response to determining that the first-user media profile and the second-user media profile bear at least the predetermined level of similarity to each other: identify the recommended media based on characteristics of the first-user media profile and characteristics of the second-user media profile, and initiate provision of the recommended media to one of the user of the first vehicle and the user of the second vehicle.

The disclosure further relates to a computer-implemented method for recommending media to a user of a vehicle. The method includes a computer-processor, executing computer-readable instructions stored in a tangible storage medium determining that a first vehicle and a second vehicle are proximate to each other. The method also includes obtaining a first-user media profile, the first-user media profile indicating media preferences of a user of the first vehicle, and storing the first-user media profile in a storage medium. The method further includes obtaining a second-user media profile, the second-user media profile indicating media preferences of a user of the second vehicle, storing the second-user media profile in the storage medium, and evaluating the first-user media profile and the second-user media profile to determine whether the first-user media profile and the second-user media profile have the predetermined similarity to each other.

The method yet further includes, in response to determining that the first-user media profile and the second-user media profile bear a predetermined level of similarity to each other: identify the recommended media based on characteristics of the first-user media profile and characteristics of the second-user media profile, and initiate provision of the recommended media to one of the user of the first vehicle and the user of the second vehicle.

Other aspects of the present invention will be in part apparent and in part pointed out hereinafter.

DESCRIPTION OF THE DRAWINGS

FIG. 4 illustrates an exemplary method for comparing media profiles, including determining whether two or more media profiles are sufficiently similar.

DETAILED DESCRIPTION

Figure 1:
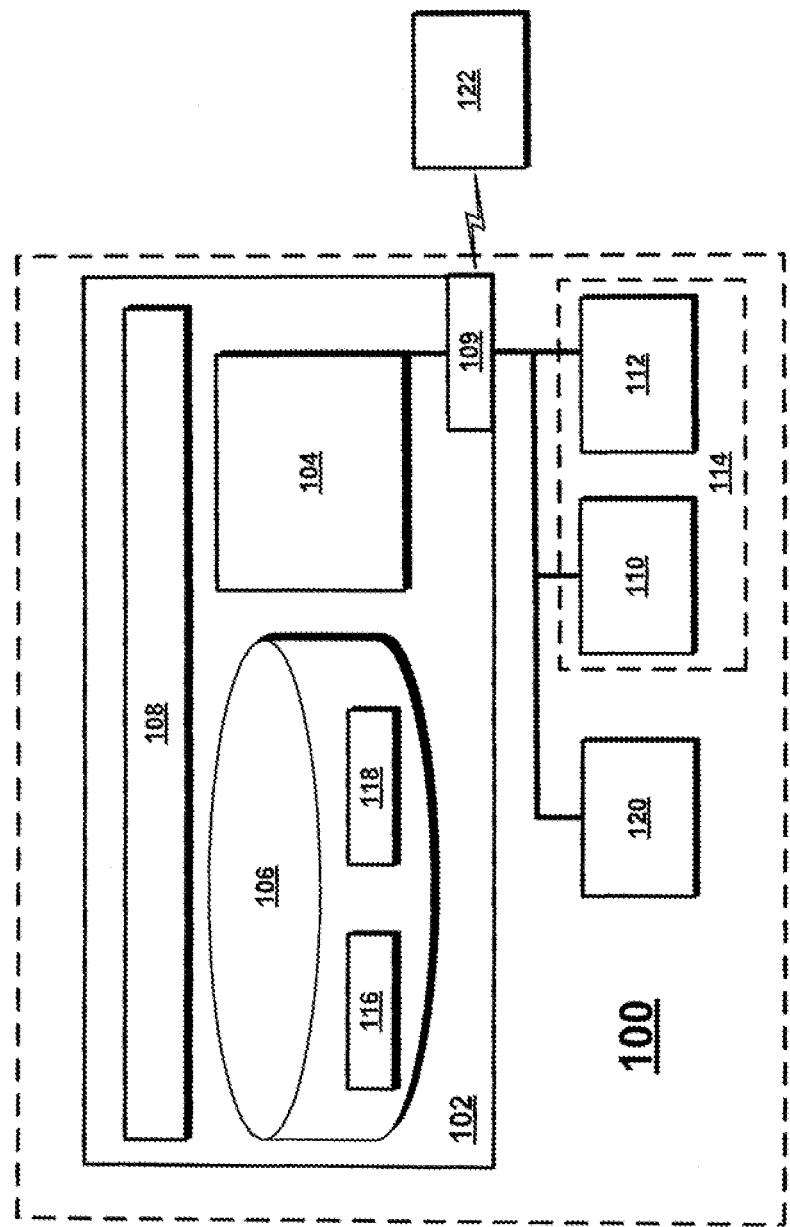
FIG. 1 illustrates an onboard computer system of a vehicle, and a personal computing device, for use in providing recommended media content to a user of the vehicle and personal computing device.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein (e.g., delegation algorithm, dissemination algorithm, migration algorithm), various such structures may be separated or combined in various combinations across the various computing platforms described herein.

I. GENERAL OVERVIEW

The present disclosure describes systems, methods, and computer-readable media configured to generate recommended media content, and communicate the recommended media content to users. The systems, in various embodiments, include vehicles, such as automobiles, and onboard computer sub-systems thereof. As further described herein, the systems for use in generating and communicating recommended media content in some embodiments also include more than one vehicle and one or more central, or remote servers.

In contemplated embodiments, the systems include personal devices associated with users, such as personal or tablet computers and smart phones. The systems may also be considered to include communication apparatus and infrastructure used for inter-device communications, such as transmitters, receivers, transceivers, and other communication components of vehicles, personal computing devices, local or distributed computer systems, and networks communicatively connecting them.

Generally, recommendations are generated based on relationships between media profiles associated with users of the vehicles. The media profiles reflect user preferences for one or more types of media content. An example of media content is commonly known as infotainment, including any of various forms of information and entertainment, such as data related to music, news, reports, navigation, weather, and the like, received by way of Internet radio, music sharing, podcast, compact disc, digital video disc, other portable storage device, video on demand, and the like.

The preferences are determined by the disclosed systems inherently or by way of express user input. Inherent preference determination includes developing and/or updating preferences based on user activity in connection with a type of media. For instance, preferences can be determined based on an amount of time that a user listens to a certain satellite radio channel, or music of a certain genre.

Recommended media content is generated by any one or more of the computing devices described herein. In one aspect, two vehicles encounter each other and communicate by short-range wireless communications. In this aspect, an onboard computer system of a first vehicle of the two compares a media profile of a user of the vehicle to a media profile of a user of the other vehicle. The onboard system can generate recommended media for the user of either vehicle, and initiate provision of the recommendation to the appropriate user. In another aspect, a remote system, such as a central server, generates recommended media, based on media profiles of two or more vehicle users, and initiates provision of the media to the users.

II. VEHICLE-TO-VEHICLE MEDIA RECOMMENDATION SYSTEM

Turning now to the figures, and more particularly to the first figure, FIG. 1 illustrates schematically a vehicle 100, such as an automobile. Select components of the vehicle 100 are developed and configured to determine and communicate recommended media for use by a user of the vehicle and/or by use of a user of another vehicle. The vehicle 100 determines the recommended media based at least in part on a media profile associated with the user of the vehicle 100 and a media profile associated with the user of another vehicle. Although the present disclosure is described primarily in connection with automobiles, the teachings herein are not limited to use with automotive vehicles.

The vehicle 100 includes an onboard computer system 102. The onboard computer system 102 includes a computer processor 104 in communication with a tangible computer-readable storage medium 106 (e.g., computer memory) by way of a communication bus 108 or such computing infrastructure.

The onboard computer system 102 also includes one or more communication interfaces 109 facilitating communications to and from the system 102. The communication interface 109 includes one or more of a variety of input/output (I/O) connections for input/output of data, such as from signal receivers, transmitters, and transceivers, as described further below.

In some embodiments, the onboard computer system 102 is configured to communicate with one or more local or remote devices such as a local remote control device, a cellular phone, another personal device, and a remote computer server. For communicating with a remote device, the processor 102 is configured to facilitate wired or wireless communications with an external communication network. Exemplary external communication networks include, but are not limited to cellular networks, Voice over Internet Protocol (VoIP) networks, local area networks (LANs), wide area networks (WANs), personal area networks (PANs), and other communication networks.

In some embodiments, the external systems are implemented using IEEE 802.x (e.g. IEEE 802.11), WI-FI®, WIMAX®, BLUETOOTH®, near field communications (NFC), the like, or improvements thereof (WI-FI is a registered trademark of WI-FI Alliance, of Austin, Tex.; WIMAX is a registered trademark of WiMAX Forum, of San Diego, Calif.; BLUETOOTH is a registered trademark of Bluetooth SIG, Inc., of Bellevue, Wash.).

The vehicle 100 also includes a receiver 110 operatively connected to the processor 104, and a transmitter 112 operatively connected to the processor 104. In some embodiments, the receiver 110, the transmitter 112, or both the receiver and transmitter are considered a part of the onboard computer system 102. In some cases, the receiver 110, the transmitter 112, or both are embodied in a transceiver 114 capable of receiving and transmitting signals of one or more types. While a single receiver 110 and transmitter 112 are shown, the receiver 110 and transmitter 112 schematically illustrate one or more various receivers, transmitters, and/or transceivers, for receiving and sending signals of various types, including relatively short-range communications or longer-range communications, such as signals for a cellular communications network.

An example of relatively short-range communications is Dedicated Short-Range Communications (DSRC). Although short-range communications are primarily disclosed herein, and with respect to vehicle-to-vehicle (V2V) communications, longer-range communications may also be used with the embodiments of the present disclosure. Short-range communications use one or more short-range communication protocols, such as DSRC, IEEE 802.x, WI-FI®, BLUETOOTH®, infrared, IRDA, NFC, the like, or improvements thereof.

The techniques of the present disclosure may also be used in combination with vehicle-to-infrastructure (V2I), vehicle-to-pedestrian (V2P), or other vehicle-related (V2X) communications, including various types of ad hoc networks, such as cellular or other mobile ad hoc networks.

The computer-readable medium 106 can include any of a wide variety of media including, for example, volatile media, non-volatile media, removable media, and non-removable media. The term computer-readable medium and variants thereof, as used in the specification and claims, refers to storage media. In some embodiments, storage media includes volatile and/or non-volatile, removable, and/or non-removable media.

For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data and that can be accessed by users.

The computer-readable storage medium 106 stores instructions 116 that, when executed by the processor, cause the processor to perform various acts of the present technology, described herein, including comparing media profiles, preparing recommended media content, and initiating provision of recommended media content to the user of the vehicle 100 or a user of a second vehicle that the first vehicle 100 encounters. The instructions 116 may be embodied in the form of one or more programs or applications (not shown in detail).

The instructions 116 may be stored in the medium 106 in one or more modules (not shown in detail). For instance, a user media profile can be prepared by the processor 104 executing instructions 116 of a media profile formation module, the profile can be updated by executing instructions 116 of a media profile update module, media profiles can be compared by the processor 104 executing instructions 116 of a media profile comparison module, and media profiles, of one or more users of one or more other vehicles, can be compared by the processor 104 executing instructions 116 of a media profile comparison module.

Additional embodiments and components of the present technology, such as infrastructure supporting long-range communications, are described further below in connection with FIG. 2.

III. GENERATING USER MEDIA PROFILE

The instructions 116 are configured to cause the processor 104 to create a media profile 118 corresponding to a user of the vehicle 100. As described further below, the user media profile 118 is, in some embodiments, generated outside of the onboard computer system 102 and transferred to the onboard computer system 102. Generally, any function described by way of teaching example herein as being performed at a particular component, device, or system, is in other embodiments performed at any other of the components, devices, and systems referenced herein.

While instructions 116 and the media profile 118 are shown generally as residing in the computer-readable storage medium 106, various data, including the instructions 116 and media profiles 118 are in some embodiments stored in a common portion of the storage medium, in various portions of the storage medium 106, and/or in other storage media, such as a remote storage medium, as described further below.

The user media profile 118 is indicative of media preferences of the user of the vehicle 100. The preferences can be expressed by the user, and deduced by the processor 104 executing the instructions 116, in any of a variety of ways. As an example, user preferences can be expressed, and deduced, expressly, such as by way of the user providing a selection or vote, such as by providing a "like" or "favorite" selection, for media-related item, such as a media channel, a media genre, an artist(s) (e.g., composer, writer, singer, etc.), instrument(s), or a particular file (e.g., song).

As another example, the user media preferences can be expressed, and deduced, implicitly, such as in connection with the user playing or otherwise experiencing a certain media item, such as a channel, genre, artist, instrument, or file. In some embodiments, an objective representation, such as score, points, or rating, ranking, is applied to the user profile 118 in connection with a media channel, genre, artist, instrument, or file only if the channel, genre, artist, instrument, or file is played for at least a threshold amount of time. In some cases, an amount of time that a channel, genre, artist, instrument, or file is played affects representation of the channel, genre, artist, instrument, or file in the profile 118, as also described more below. Playback volume level can also be used to deduce user media preference. Nominal levels could be determined for each genre or across all genres and scores could be adjusted up or down based on the volume level setting.

The user media profile 118, in various embodiments of the present technology, takes one or more of various forms. In one embodiment, the profile 118 is represented, or quantified, as a multi-dimensional vector or other set. More than one vector can be associated with a particular user. In some embodiments, each profile associated with the user includes a separate vector, and in other embodiments, a profile 118 includes more than one vector.

The profile 118 for a user (e.g., "user i") can include an m-dimensional vector, represented as follows:

$$\vec{V}_i = [v_i^1, v_i^2, v_i^3 \ldots v_i^m]$$

where m is a positive integer. Although more than three dimensions are shown in this exemplary vector, the vector could include three or less dimensions. Each dimension (e.g., $v^1$, $v^2$, etc.) of the vector V represents a media factor for the profile 118, or a combination of media factors. The value for each dimension represents a corresponding score, point value, rating, or ranking for the user in connection with the media factor. Example media factors include a media genre, a media channel, an artist, instrument, and a media file, such as a certain song.

Thus, the vector values, $v^1$ $v^2$, etc., could represent a score, points, rating, or ranking for the user in connection with the media factor, such as by being a score allocated to the user for a media genre, such as classical music, a particular artist, instrument, such as composer Vivaldi, a certain media channel, such as a particular satellite radio channel, a certain song, such as the Spring Concerto by Vivaldi, or another particular media item.

As provided, the score, point, ranking, or rating value for a vector dimension in some embodiments relates to an amount of time that the user played, listened to, or otherwise experienced the related media. For example, the value for a dimension could represent a number of seconds or minutes that a user listened to a station, songs in a genre, songs associated with a particular artist, instrument, etc. The dimension could also represent a percentage of media time (e.g., listening and/or viewing time) that the user spent in connection with the corresponding station, songs in a genre, songs associated with a particular artist, instrument, etc.

An example related to music genres, or channels, includes a set of ten genres or channels: blues, classical, country, dance, folk, hip hop, jazz, Latin, new age, and pop. Thus, the vector shown above ($\vec{V}_i = [v_i^1, v_i^2, v_i^3 \ldots v_i^m]$) could in this case, by way of example, be represented as:

$$V_i = [B, Cl, Co, D, F, H, J, L, N, P]$$

In a particular scenario, the user experienced media in these ten areas, such as from a satellite radio station, in these genres or channels in the following ways:

15% Experienced music related to Blues
5% Experienced music related to Classical
0% Experienced music related to Country
0% Experienced music related to Dance
35% Experienced music related to Folk
0% Experienced music related to Hip Hop
30% Experienced music related to Jazz
0% Experienced music related to Latin
0% Experienced music related to New Age
15% Experienced music related to Pop The corresponding vector could thus be represented accordingly, such as by any of:

$$V_i = [15\%, 5\%, 0\%, 0\%, 35\%, 0\%, 30\%, 0\%, 0\%, 15\%],$$

$$V_i = [15, 5, 0, 0, 35, 0, 30, 0, 0, 15],$$

$$V_i = [0.15, 0.5, 0.0, 0.0, 0.35, 0.0, 0.3, 0.0, 0.0, 0.15],$$

or the like.

In some embodiments, one or more vectors, and dimensions to be included in each vector, in connection with a user, are selected by one of the computing devices disclosed herein. Such computing devices include the onboard computer system 102, a personal device of the user, such as a smart phone, a computer of the user, or a remote server, such as a server operated by a media content provider or an entity associated with the vehicle.

In a contemplated embodiment, the user is able to affect the vector or vectors associated with the user, dimensions in each vector, and/or dimension values. For example, the computing devices disclosed herein (e.g., system 102) is configured to accept and process, and in some cases request, user selection or other input for expressly affecting existence, character or values of vectors, dimensions thereof.

For instance, the user can add or remove dimensions. The user may interface with one or more of the computing devices herein to affect the dimensions. For instance, the user may enter information regarding a vector or vector dimension into a human-to-machine-interface (HMI) (e.g., human-to-vehicle-interface (HVI)) sub-system 120, as shown schematically in FIG. 1. Exemplary HMI sub-systems 120 include any of a touch-sensitive or other visual display, a keypad, buttons, or the like, a speaker, microphone, or the like, operatively connected to the processor 104.

By way of the HMI sub-system, the user can input information regarding a media profile, or a vector or vector dimension, thereof. The input can be provided in ways including by oral communications, via audio input. Thus, for instance, the sub-system or onboard computer system 102 in some embodiments includes components allowing speech-to-data, such as speech-to-text, or data-to-speech, such as text-to-speech conversions.

Figure 2:
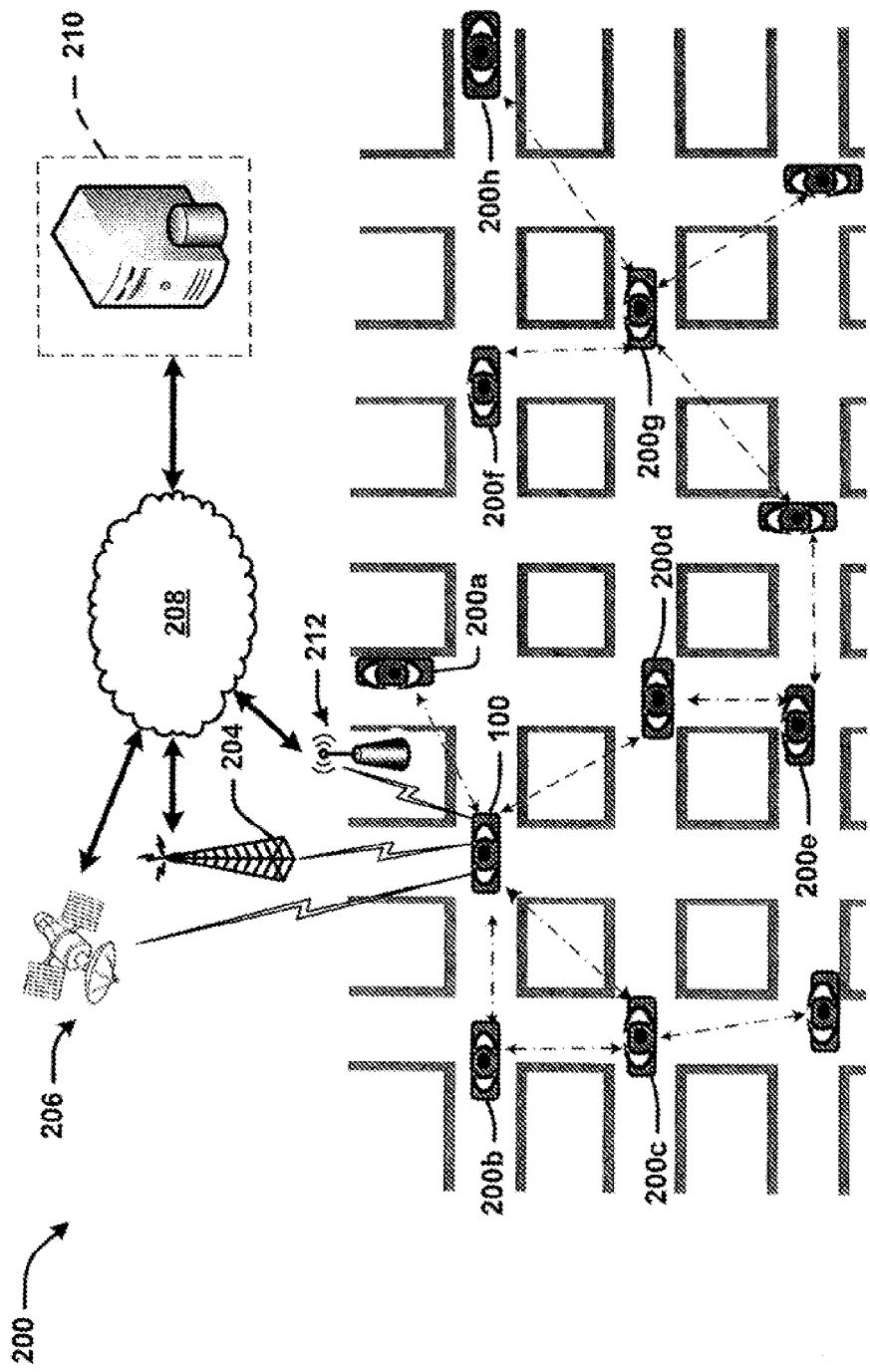
FIG. 2 illustrates a networked environment for use in providing recommended media content to the user.

In another case, the user inputs selected information to a personal device of the user, such as a personal or tablet computer or a smart phone, which in turn communicates the information to the onboard computer system 120 and/or central server by wireless or wired communication (see e.g., the remote server 210 as shown in FIG. 2).

IV. STORING THE USER MEDIA PROFILE

The user media profile 118 is in various embodiments stored in a computer-readable medium associated with one or more of the computing devices disclosed herein. For instance, the processor 104 of the onboard computer system 102 can, executing the instructions 116, store the profile 118 in the computer-readable medium 108 thereof, as shown in FIG. 1.

V. UPDATING USER MEDIA PROFILES

The media profile 118 associated with a user may be updated, customized, or tailored, by the any computing device disclosed herein, such as the onboard computer system 102, alone, by a combinations of devices, or by the user via any one or more of the computing devices. Updates include adding or removing a vector and adding or removing a vector dimension. Updates also include increasing or decreasing a vector dimension value or other score, point, ranking, or rating associated with a feature of the profile 118.

As with forming the profile 118, the profile 118 can be updated expressly or implicitly based on user actions. In one embodiment, an express action includes the user providing input to a computing device described herein, such as the onboard computer system 102 or personal computing device of the user. For example, any of the computing devices described herein can be programmed to present an interface to the user allowing the user to expressly indicate points, scores, ratings, rankings or other values for a profile, such as for a dimension of a vector.

Inherent updates can be based on activities associated with the user experiencing media content. Example experiencing activities include listening to media content associated with a particular genre, channel, song, or artist, instrument. A computing device, such as the onboard computer system 102, personal user device, or the remote server 210, receives information indicative of the user being exposed to media content (e.g., listening to the media content).

The computing device (e.g., onboard computer system 102) in some embodiments obtains the information in response as part of monitoring media content being delivered to the user, and in some embodiments in response to the receiving a request to obtain the information from another computing device (e.g., remote server 210).

VI. VEHICLE-VEHICLE ENCOUNTER

The vehicle 100 encounters another vehicle when the vehicle is proximate the other vehicle, such as by being within range allowing short-range or medium-range communications between the vehicles. With continued reference to the figures, FIG. 2 illustrates an environment 200 including the first vehicle 100 and multiple other vehicles 202a-h, etc. The vehicles 202a-h, etc., are at times herein associated with reference character 202x. The other vehicles 202x may be equipped and configured like the vehicle 100 described primarily herein.

The environment 200 of FIG. 2 also has long-range communication nodes, such as cellular base stations 204 or communication satellites 206. The long-range communication nodes are communicatively connected to a communication network 208, such as one or more of a cellular telephone network and the Internet. The environment 200 also includes a remote, or central, server 210 communicatively connected to the communication network 208.

By way of the long-range communication nodes, the vehicle 100, other vehicles 202x, and the central server 210 can communicate with each other to share data, such as packetized data and voice data. Thus, in this environment 200, each vehicle 100, 202x can communicate with any other vehicle, even if the other vehicles are not nearby, such as by way of communications from the vehicle 100, 202x to the remote server 210, and from the remote server to the other vehicles, or by way of communications through the communication network 208 without involvement of a central server.

The environment 200 may also include short-range communication beacons or nodes 212, such as wireless access points. A wireless access point is a transceiver allowing wireless devices such as the onboard computer system 102 and properly-equipped personal devices such as smart phones and laptop computers, to connect to the communication network 208. Communications between wireless devices and wireless access points are typically facilitated using DSRC, IEEE 802.x, Wi-Fi®, Bluetooth®, or related or similar standards. Short-range communication nodes 212 are commonly positioned in homes, public accommodations (coffee shops, libraries, etc.), and as road-side infrastructure such as by being mounted adjacent a highway or on a building in a crowded urban area.

Each vehicle 100, 202x is equipped with components enabling short-range and/or medium-range communications.

References herein to short and long-range communications can for various embodiments include what may be known as medium range communications. For instance, what may be referred to as medium range communications, according to a particular communications standard, for instance, may be considered as a short-range communication or a long-range communication. Generally, short-to-medium range communications include communication protocols allowing communication between enabled devices being within about fifty meters, in some cases within about one-hundred meters, and in other cases even within one-thousand meters or more, depending on the particular communication standard.

By short-range communications, the vehicles 101, 202x can communicate directly with each other—that is, without intervening structure, such as a roadside node 212 or cellular network. Such communications are commonly referred to colloquially as vehicle-to-vehicle, or V2V, communications. By short-range communications, the vehicles 101, 202x can also communicate with the short-range nodes 212. Such communications are sometimes referred to colloquially as vehicle-to-infrastructure, or V2I, communications.

By short-range communications, the vehicles 100, 202x can also communicate with nearby short-range nodes 212 other than those affiliated with a transportation infrastructure. As provided, the vehicles 100, 202x are also equipped with components enabling long-range communications.

As provided, short-range communications can be affected using the DSRC standard, which facilitates wireless communication channels specifically designed for automotive vehicles. The vehicles 100, 202x are configured to communicate by way of one or more short-range communication protocols, such as DSRC, IEEE 802.x, WI-FI®, BLUETOOTH®, infrared, IRDA, NFC, the like, or improvements thereof. It is also contemplated that short-range communications can be affected using a traditionally long-range communication protocol.

Accordingly, a vehicle 100, 202x can detect another vehicle in its proximity by short-range communications. Operations disclosed herein as being performed by a vehicle 100, 202x, are in some embodiments performed by the onboard computer system 102 and ancillary components such as the receiver 110, the transmitter 112, or transceiver 114. As provided, these components may be considered parts of the onboard computer system 102.

Proximate vehicles 100, 202x can share information such as information identifying the vehicle or user, media profiles (e.g., profile 118, of FIG. 1), and information indicating a location of the vehicle or other operational or safety-related information. The location could be, for instance, a geographic location, such as a state, county, city, or other region, latitude/longitude coordinates, or other geographic coordinates or indicator.

In some embodiments, each of the proximate vehicles 100, 202x is configured to also send communications to the remote server 210 indicating that the vehicle has detected the other vehicle. The remote server 210 can process the communication accordingly, such as by storing data linking the detecting and detected vehicle. In a particular embodiments, only one of the vehicles 100, 202x sends the indicating communication, the other not sending such indication based on established protocols used by the vehicles, an agreement (e.g., handshake communication), between the vehicles etc., establishing which sends the indication to the server 210.

In some embodiments, the remote server 210 determines that two or more of the vehicles 100, 202x are proximate each other, or within a certain distance of each other. The remote server 210 may base this determination on information received from the vehicles or a location register associated with the vehicles. In response to making the determination, the server 210, in some embodiments, obtains or accesses media profiles for the two or more vehicles 100, 202x, generates recommended media content for one or more users of the vehicles 100, 202x, and initiates sending of the recommended media content to the vehicles for presentation to the users.

VII. VEHICLE GENERATION OF RECOMMENDED MEDIA CONTENT

The onboard computer system 102 of each vehicle 100, 202x can generate recommended media content for the user of the respective vehicle and/or for users of the other vehicles. Generating recommended media content includes comparing at least two media profiles associated with the users. For example, the onboard computer system 102 of the vehicle 100 is configured to generate recommended media for the user of the vehicle 100 and/or for a user of another vehicle 202x by comparing the media profile 118 associated with the user of the vehicle 100 with a media profile associated with the user of the other vehicle 202x.

The onboard computer system 102 the vehicle 100 can obtain the media profile of the user of the vehicle 100, and the media profile of the user(s) of the other vehicles 202x, in any of a variety of ways. In one embodiment, the onboard computer system 102 of the vehicle 100 receives the media profile(s) from the other vehicle(s) 202x, such as by way of the receiver 110. The media profile(s) may be sent to the vehicle 100 directly, by way of short-range communication, or indirectly, such as via the long-range network 208, with or without involvement of the remote server 210. In a particular embodiment, the onboard computer system 102 of the first vehicle 100 transmits a request to the other vehicle(s) 202x, directly or indirectly, requesting the media profile(s) of the user(s) of the vehicle(s) 202x, and the other vehicle(s) 202x reply by sending to the first vehicle 100, directly or indirectly, the respective media profile(s). The vehicle 100 in some embodiments sends such request in response to determining that the other vehicle 202x is proximate, such as by detecting short-range communications from the other vehicle 202x, or receiving indication from the remote server 210 that that the other vehicle 202x is proximate. In a contemplated embodiment, the vehicle 100 first presents the user of the vehicle 100 with an option to send the request, and only sends the request in response to the user approving sending of the request.

The onboard computer system 102 of the vehicle 100 is also, in contemplated embodiments, configured to determine (i) whether to compare the media profile 118 of the user of the vehicle 100 with the media profile associated with the user of the other vehicle 202x and/or (ii) whether to share the media profile 118 associated with the user of the vehicle 100 with another vehicle 202x, or another of the computing devices described herein, such as the remote server 210. In particular embodiments, the onboard computer system 102 makes this determination based on whether at least one threshold condition is satisfied, or at least one triggering event occurs or circumstance is determined to exist. References herein to one of a threshold condition, triggering event, or circumstance can be replaced by any other of these terms. For instance, references to considerations of threshold conditions should be interpreted to encompass embodiments in which a triggering event is considered.

An example threshold condition includes the onboard computer system 102 determining that at least one of the other vehicles 202x is nearby or in sufficiently-close proximity. Sufficient proximity can be determined in any of a variety of ways. One measure of necessary proximity is related to a range of short-range communications of the vehicle 100. In embodiments employing this measure, the vehicle 100 determines that another of the vehicle 202x is nearby or proximate in response to the vehicle 100 receiving a short-range communication signal (e.g., DSRC signal) from the other vehicle 202x.

In one embodiment, the vehicle 100 determines that the other vehicle 202x is within sufficient proximity based on a comparison of location information (e.g., latitude-longitude information) associated the vehicles 100, 202x. The comparison can be performed at the onboard computer system 102 or at the remote server 210. Location information may be generated in the vehicles or the remote servers, such as by use of a global navigation satellite system (GNSS), such as the global positioning system (GPS).

For embodiments in which the comparison is performed at the onboard computer 102 of the vehicle 100, the vehicle 100 can obtain the location information of the other vehicle 202x directly from the other vehicle, by short or long-range communications, or from a remote device, such as a location register or the remote server 210.

Another example threshold condition to be satisfied prior to the onboard computer system 102 determining to compare the media profiles, or prior to sharing the media profile 118 associated with the user of the vehicle 100, relates to at least one predetermined relationship between the vehicles 100, 202x and/or the user of the vehicle 100 and the user of the other vehicle 202x. One example of such a relationship is a determination that the vehicles 100, 202x are within a certain proximity of each other, based on information determined in the vehicle or otherwise, such as by the remote server 210.

Another example of such a relationship is the users of the vehicles 100, 202x having attributes in common, such as by the user of the vehicle 100 and the user of the other vehicle 202x both having home addresses within a certain region of the country, region of a state, metropolitan area, etc. Other example relationships include demographic information, age, sex, features of respective media profiles of the vehicle users, etc. Other example relationships may include vehicles of the same make or model.

In some embodiments, the determination of whether the user of the vehicle 100 bears the predetermined relationship to a user of another vehicle 202x includes consideration of more than one attribute, such as by being based on age and present location. The determination that the vehicle 100 bears the predetermined relationship with another vehicle 202x, or that a user bears the predetermined relationship to another user, can be made at the onboard computer system 102 of the vehicle 100, at a separate device such as the remote server 210, or at another device, such as a personal computing device 122.

In one embodiment, the onboard computer system 102, or other computing device, presents the user of the vehicle 100 with an option of whether to compare a media profile associated with the user with a media profile associated with a user of another vehicle 202x and/or to share the media profile associated with the user of the vehicle 100 with another vehicle 202x or device. User may create select folders, such as a "Shared" folder and a "Private" folder. In one embodiment, such folders are inferred from and created based on information associated with relevant media, such as Digital Rights Management (DRM) tags that may be embedded in the content.

The onboard computer system 102 can present the option by way of an HMI sub-system, such as an audio or visual sub-system, and receive selections from the user by way of these subsystems, such as subsystems including one or more dashboard buttons operatively connected to the onboard computer system 102. And, in some embodiments, the onboard computer system 102 is configured to present the user with this option in addition to determining, before or after the option is presented, whether a threshold condition is satisfied, such as the thresholds described above.

In one contemplated embodiment, a threshold condition is that the user of the other vehicle 202x is determined to be participating in a media content recommendation program. The program may be instituted by, for instance, a customer or driver-assistance service company, such as OnStar®. The vehicles 100, 202x of participants in the program are programmed to communicate accordingly, such as, in various embodiments, to share the profile of the vehicle user by short or long range communication with other vehicles and/or a remote device, receive profiles of other vehicles, generate recommended media content, receive media content recommendations, and implement recommended media content for use by the vehicle user.

In one contemplated embodiment, the onboard computer system 102 is configured to compare the media profile 118 associated with the vehicle user to one or more media profiles of users of other vehicles 202x only upon receiving permission or authorization from the user. The onboard computer system 102 is in some embodiments configured to prompt the user for such authorization in any of a variety of ways, including by way of the HMI sub-system 120 described above. The prompt could provide information for use by the vehicle user in determining whether to provide the authorization, such as information about the user of the vehicle 100, the profile of the user of the vehicle 100, the user of the other vehicle 202x, the profile of the user of the other vehicle 202x, a level of similarity found between the users, profiles, or vehicles 100, 202x, and the like.

The onboard computer system 102 is in some embodiments arranged to allow the user of the vehicle 100 to establish a standing instruction, or user preference, whereby the system 102 is authorized to automatically perform comparisons (e.g., "always prompt", "never prompt", comparison settings for individual content types such as audio, video, podcasts, etc.), such as following determination that a threshold condition exists. The vehicle 100 is in some cases configured to receive authorization from the vehicle user by user input, such as by way of the HMI sub-system 120.

As provided, the onboard computer system 102 is configured to compare a media profile 118 associated with the user of the vehicle 100 with a received media profile associated with a user of the other vehicle 202x. The particular manner in which the onboard computer system 102 compares the profiles depends, in some embodiments, on a format of the profiles. In an embodiment described above, the profiles are represented as multi-dimensional vectors. In a particular embodiment, the instructions 116 of the onboard computer system 102 are configured to cause the processor 104 to compare such multi-dimensional vectors mathematically, such as by a cosine similarity analysis. Cosine similarity is a method of measuring similarity between two vectors by measuring a cosine of at least one angle separating the vectors.

As an example of an analysis using cosine similarity, two vectors are considered, vector $V_i$ and vector $V_j$, being represented follows:

$$\vec{V}_i = [v_i^1, v_i^2, v_i^3 \ldots v_i^m]$$

$$\vec{V}_j = [v_j^1, v_j^2, v_j^3 \ldots v_j^m]$$

A similarity $sim(V_i, V_j)$ between the two vectors $V_i, V_j$ can be calculated as follows:

$$sim(\vec{V}_i, \vec{V}_j) = \cos(\vec{V}_i, \vec{V}_j) = \frac{\vec{V}_i \otimes \vec{V}_j}{\|\vec{V}_i\| \cdot \|\vec{V}_j\|}$$

$$= \frac{\sum_{k=1}^{m} v_i^k v_j^k}{\sqrt{\sum_{k=1}^{m} (v_i^k)^2} \sqrt{\sum_{k=1}^{m} (v_j^k)^2}}$$

The instructions 116 in some embodiments include a similarity threshold to which the result of the similarity analysis $sim(V_i, V_j)$ is compared. If the result of the similarity analysis $sim(V_i, V_j)$ is less than the threshold, then the vectors $V_i, V_j$ are considered sufficiently similar. In some embodiments, the similarity threshold is set so that vectors being compared to each other are considered sufficiently similar if the similarity $sim(V_i, V_j)$ is less than or equal to the threshold.

Similarly, if the result of the similarity analysis $sim(V_i, V_j)$ is greater than the similarity threshold, then the vectors $V_i, V_j$ are considered relatively distinct. In some embodiments, the similarity threshold is set so that vectors being compared to each other are considered distinct if the similarity $sim(V_i, V_j)$ is greater than or equal to the threshold.

If the vectors $V_i, V_j$ are considered sufficiently similar, the vectors $V_i, V_j$ are considered to be a match for purposes of triggering generation of recommended media content for one or both of the users associated with the media profiles and corresponding vectors, and the onboard computer system 102 continues to generate recommended media content. In some cases, if the vectors $V_i, V_j$ are found to not be matching, then the onboard computer system 102 does not generate recommended media content based on the profiles corresponding to the vectors $V_i, V_j$.

In one embodiment of the present disclosure, determining recommended media content includes identifying media content that is present in one of the matching profiles but not in the other. The media content identified in this way can then be recommended to the user associated with the profile not having the identified media content. More specifically, media content intended for the first vehicle user, of the vehicle 100, associated with the first vector, $V_i$, can be mathematically represented as a union of the first vector $V_i$ and the second $V_j$, minus the first vector $V_i$, or:

$$V_i \cup V_j - V_i$$

Likewise, media content intended for the second vehicle user, of the another vehicle 202x, associated with the second vector, $V_j$, can be mathematically represented as a union of the first vector $V_i$ and the second $V_j$, minus the second vector $V_j$, or:

$$V_i \cup V_j - V_j$$

In these ways, each particular vehicle user is presented with suggested media content that the particular user has not previously been exposed to, or at least media content that was not previously present in their media profile.

In contemplated embodiments, recommended media content includes media content that is present in the vehicle user's profile. For example, the onboard computer system 102 can be configured to generate the recommended media content to include the result of the union of profiles, mentioned above, and without performance of the mentioned subtraction act.

In another contemplated embodiment, the onboard computer system 102 is configured to advise the vehicle user of status at any of various stages of the present processes. For instance, the onboard computer system 102 could be configured to notify the user, such as by way of the HMI sub-system 120, that recommended media content is about to be generated, is being generated, and/or has been generated.

VIII. GENERATION OF RECOMMENDED MEDIA CONTENT AT REMOTE DEVICE

As described above, the user media profile 118 is, in some embodiments, generated outside of the onboard computer system 102 and transferred to the onboard computer system 102. The media profile 118 is in some embodiments generated at one or more computing devices outside of the onboard computer system 102. Example computing devices outside of the onboard computer system 102 include the remote server 210 and a personal computing device of the user 122.

In a contemplated embodiment, a personal computing device 122 is considered a part of the vehicle 100, and in a particular contemplated embodiment, the personal computing device 122 is considered a part of the onboard computer system 102. For instance, a media player is in some cases a part of the onboard computer system 102. The media player, or other personal computing device, can be considered a part of the vehicle 100, whether the device is connected to the vehicle 100, removably, in a substantially permanent manner, or only communicates with the processor 104 by way of wireless communications.

The remote server 210 or personal computing device 122 in some embodiments determines whether to generate recommended media content, such as in ways analogous to those described above in connection with the onboard computer system 102 making such determination. The remote server 210 or personal computing device 122, in response to determining to generate recommended media content, generates the media content, in substantially the same manner described above in connection with the onboard computer system 102. For instance, the remote server 210 or personal computing device 122 is in some embodiments configured to consider whether various threshold or conditions are present prior to comparing media profiles. In one contemplated embodiment, determining whether to compare profiles is performed at one device (e.g., system 102 or server 210) and the profile is generated in another device (e.g., server 210 or system 102).

For comparing profiles to determine whether users are sufficiently similar, and in particular, in cases in which media profiles are in the form of multi-dimensional vectors, the remote server 210 or personal computing device 122 performs a comparison, such as a cosine analysis. If the profiles, and so the users, are determined to be sufficiently similar, and any other existing prerequisite conditions or thresholds are present, the remote server 210 or personal computing device 122 generates recommended media content.

In one embodiment, the remote server 210 or personal computing device 122 generates the recommended media content in the manner described above in connection with the onboard computer system 102 generating the media content. Namely, the server 210 or personal computing device 122 can identify a union of the two or more relevant profiles, and the suggested media content can be formed by the overlapping features of the profiles (i.e., the result of the union). And in some cases the recommended media content is the result of the union, minus media content associated with the media profile of the user for whom the recommended media is being generated.

The remote server 210 or personal device 122 can receive the media profiles, for use in the comparison, and eventual generation of recommended media content, in any of a variety of ways. For instance, the server or device can receive one or both profiles directly from the vehicles 100, 202x. In some embodiments, the server 210 or personal device 122 stores a copy of one or both media profiles, and uses the locally-stored copy in determining whether to generate recommended media content and generating the media content.

In scenarios in which a personal computing device 122 is performing the comparison and/or generation of recommended media content, the device 122 can store at least one media profile locally and receive one or more from outside of the device 122, or can obtain all media profiles from outside of the device 122, such as from the remote server 210 or from the onboard computer system of one or more of the vehicles 100, 202x.

Once the recommended media content is generated, the generating device (e.g., server 210 or personal device 122) can take any of various steps to implement the recommended media content for use by the vehicle user. In some embodiments, the generating device is configured to integrate recommended media content into the user profile 118 upon identifying the recommended media for the user of the vehicle 100, or upon receiving such recommended media content for the user of the vehicle 100, from a vehicle 100, 202x or another device (e.g., personal device 122 or server 210).

As with the functions of the onboard computer system 102, the generating component (e.g., server 210 or personal device 122) can perform integration steps automatically, following generation of the recommended media content for the user, or receipt of the recommended media content, or following an authorization or permission received from the user. The authorization can be received just before each integration, or previously and stored as a standing instruction or user preference.

The disclosed devices are configured to receive, in any of a variety of ways, user input, such as an authorization to receive, store, or compare profiles, generate recommended media, and whether and how to implement the media without departing from the scope of the present disclosure. For instance, the input may be received by way of a user interface, such as a touch screen, keypad, or speaker sub-system of a smart phone, laptop, or tablet computer. In cases in which a remote server 210 is the acting component, the user may provide input in various ways, such as by telephone communications to an interactive voice response (IVR) system or a customer service representative, such as customer service specialist at an OnStar® service center. The user could also provide such input by way of the Internet, such as via a personal or desktop computer, or from a mobile phone via the cellular network and/or the Internet, and web site maintained by a service provider, such as OnStar®.

The recommended media content may be provided to the user by way of any apparatus described herein, including the vehicles 100, 202x and the personal computing devices 122, notwithstanding at which device(s) the recommended media content was generated.

IX. IMPLEMENTATION OF RECOMMENDED MEDIA CONTENT

As referenced above, following identification of recommended media content, next steps include implementation of the media content for use by the vehicle user(s). In some embodiments, the onboard computer system 102 is configured to integrate recommended media content into the user profile 118 upon identifying the recommended media for the user of the vehicle 100, or upon receiving such recommended media content for the user of the vehicle 100 from another vehicle 202x or an external or remote source (e.g., remote server 210). The onboard computer system 102 is in some particular embodiments configured to perform the integration automatically, following generation of the recommended media content for the user of the vehicle 100, or receipt of the recommended media content from another vehicle 202x or an external or remote source.

In some embodiments, the onboard computer system 102 integrates the recommended media content for the user of the vehicle 100 into the profile 118 only upon receiving an authorization or instruction from the vehicle user to do so. The onboard computer system 102 is in some embodiments configured to prompt the user for such authorization in any of a variety of ways, such as by way of the HMI sub-systems 120, described above. The onboard computer system 102 is in some embodiment arranged to allow the user to establish a standing instruction, or user preference, whereby the system 102 is authorized to automatically integrate recommended media for the user into the user's profile 118. The vehicle 100 can be configured to receive authorization from the vehicle user by user input in one of a variety of ways, including by the HMI sub-system 120.

In one contemplated embodiment, recommended media is provided to the user by way of at least one personal computing device 122 (shown in FIG. 1) of the user. The personal computing device 122 and the vehicles 100, 202x are in various embodiments configured to communicate with each other by short or long-range communications. These communications may be affected by way of wired and/or wireless connections. The communication symbol shown in FIG. 1 connecting the computing device 122 and the on-board computer system 102 of the vehicle 100 is meant to represent a wireless and/or wired connection.

For instance, the device 122 and the vehicles 100, 202x are in some embodiments configured to share information with each other by BLUETOOTH® or WI-FI®. The computing device 122 is in some embodiments configured to have long-range communications, such as via the described cellular base stations 204 and/or communication satellites 206. The device 122 communicates, by any disclosed format, with vehicles 100, 202x, other personal computing devices 122, and the remote server 210, call center systems and personnel, and the like.

The personal computing device 122 can store the media profile, or a copy of the profile, and update the profile stored on the device with the recommended media content. In a contemplated embodiment, the personal computing device 122 can periodically synchronize the profile stored thereon with a profile 118 stored in the memory 106 of the vehicle and/or a profile stored remotely, such as at the remote server 210. Other devices may similarly perform synchronization functions for media profiles stored therein in connection with media profiles stored on other of the devices disclosed herein. Thus, even in cases in which recommended media may be generated at one device, such as at the onboard computer system 102 or remote server 210, it can be implemented into the media profile associated with the user at another device, such as a personal computing device 122.

In some embodiments, a media player is configured to receive recommended media content, from the processor 104, the remote server 210, or another device, and communicate the media to the user. The media can be presented to the user by way of a display screen, speakers, and/or other interfaces, whether the presenting device incorporates the recommended media into a profile associated with the user at the presenting device.

X. METHOD OF DETERMINING WHETHER TO COMPARE MEDIA PROFILES

Figure 3:
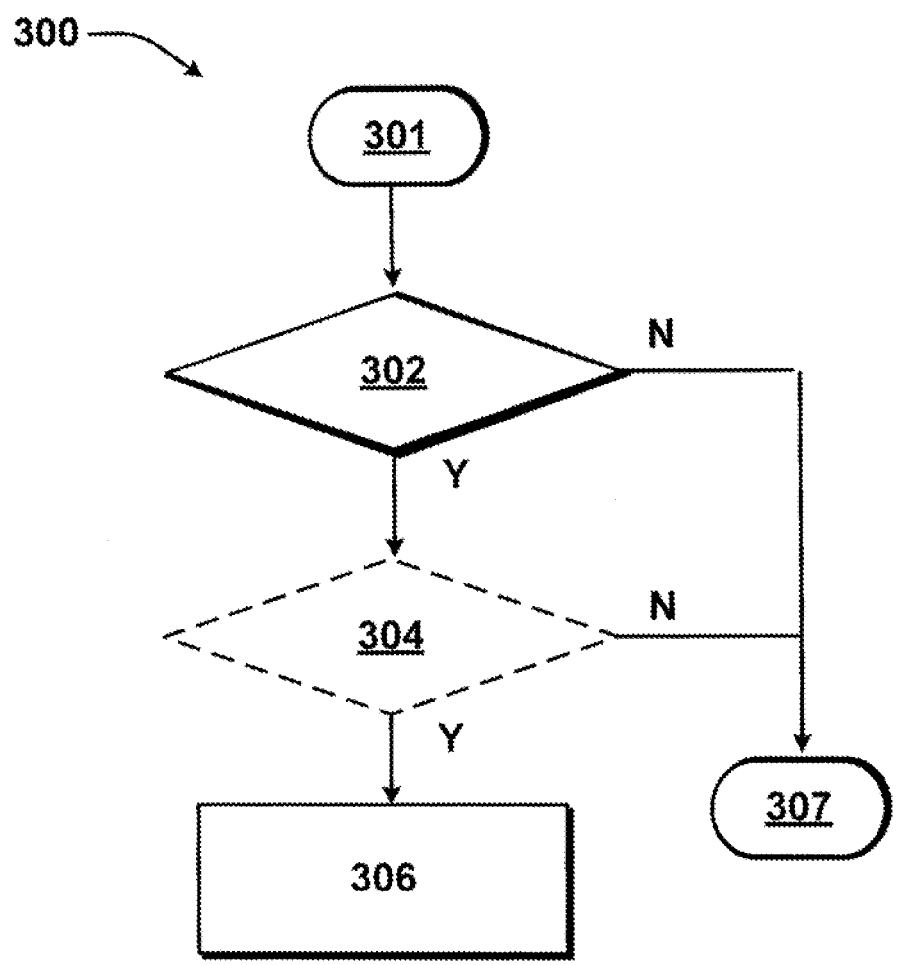
FIG. 3 illustrates an exemplary method for determining whether to compare media profiles.

FIG. 3 shows an exemplary method 300 for determining whether to compare media profiles or share a media profile, according to embodiments of the present disclosure. It should be understood that steps of the method 300 are not necessarily presented in any particular order and that performance of some or all the steps in an alternative order is possible and is contemplated.

The steps have been presented in the demonstrated order for ease of description and illustration. Steps can be added, omitted, and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer-readable medium, for example.

For instance, references to a processor performing functions of the present disclosure refer to any one or more inter-working computing components executing instructions, such as in the form of an algorithm, provided on a computer-readable medium, such as a memory associated with the processor of the onboard computer system 102 of any vehicle 100, 202x, of the remote server 210, or of a personal computing device 122. In the description of this and other methods in the present disclosure, exemplary acting devices, mostly including the onboard computer system 102, are described as acting for teaching instructions, and it should be appreciated that functions described may be performed in any one or more of the devices, components, or systems described herein.

The method 300 begins 301 and flow proceeds to step 302, whereat the onboard computer system 102 considers whether at least one threshold condition is satisfied or at least one threshold condition is determined to be met. As provided above, an example threshold condition includes the onboard computer system 102 determining that at least one of the other vehicles 202x is nearby or in close proximity. This condition is described in further detail above.

As also provided above, another example threshold condition relates to at least one predetermined relationship between the user of the vehicle 100 and a user of another vehicle 202x. Examples of this relationship include the vehicles 100, 202x being within a certain proximity of each other and the users of the vehicles 100, 202x having attributes in common, such as home addresses being within a certain region of the country, region of a state, metropolitan area, etc. Other example relationships include age, sex, and any other common distinguishing factors of people, vehicles, or service accounts associated with users or vehicles.

It is contemplated that the considered attributes could also relate to the media profiles of the vehicle users, such as a categorization or type associated with the users of the vehicles 100, 202x. Such categorizations or types could be created based on the respective profiles. For instance, a user can be categorized as a certain type of listener, such as heavy jazz listener, based on their profile. The type can be represented in any of a wide variety of manners without departing from the scope of the present application, such by numerically indicator.

In one contemplated embodiment, a threshold condition is that the user of the other vehicle 202x is determined to be participating in a media content recommendation program. The program may be instituted by, for instance, an entertainment or driver service company, such as OnStar®.

The determination of whether the user of the vehicle 100 bears the predetermined relationship to the user of the other vehicle 202x could include consideration of more than one attribute, such as by being based on age and present location. The determination that the vehicle 100 bears the predetermined relationship with another vehicle 202x can be made at the onboard computer system 102 of the vehicle 100, at a remote device such as the remote server 210, or at another device, such as a personal computing device 122 associated with the user.

If the evaluation of step 302 results in a negative outcome, flow of the method 300 can proceed to step 307, whereat the method 300 ends or is repeated, such as in connection with other users and/or media profiles. If the result of the evaluation of step 302 is positive, flow proceeds to additional steps, which in some embodiments include optional step 304.

At the optional step 304, the onboard computer system 102, or other computing device, presents the user of the vehicle 100 with an option of whether to compare a media profile associated with the user with a media profile associated with a user of another vehicle 202x and/or to share the media profile associated with the user of the vehicle 100 with another vehicle 202x or device.

The onboard computer system 102 can present the option of step 304 by way of an HMI sub-system 120, such as an audio/visual sub-system of the vehicle 100, and receive selections from the user by way of these or other subsystems, such as dashboard buttons or a voice-to-date converter operatively connected to or associated with the processor 104 of the onboard computer system 102. In some embodiments, the onboard computer system 102 is configured to present the user with the option of step 304 in addition to determining, before or after the option is presented, whether a threshold condition is satisfied, such as the thresholds described above.

Further regarding step 304, the onboard computer system 102, or other computing device, could be configured to allow the user to provide permission or authorization to compare the user's profile with a profile of another, or share the user's profile. The system 102 or other device could be configured to receive this permission with or without prompting. For instance, in some embodiments, the system 102 or other device presents to the user a prompt seeking permission to compare or share. Such a prompt, in some embodiments, provides information to the user for use in determining whether to provide the permission. The information may include, for instance, information about the profile of the user of the vehicle 100, a profile of the user of the other vehicle 202x, a level of similarity found between the users, and the like.

The onboard computer system 102 is in some embodiment arranged to allow the user to establish a standing instruction, or user preference, whereby the system 102 is, in connection with step 304, authorized to automatically perform comparisons, such as following determination that a threshold condition exists.

If the evaluation of step 304 results in a negative outcome, flow of the method 300 can proceed to the method being repeated or ending 307. If the result is positive, flow proceeds to additional steps, including step 306.

At step 306, the onboard computer system 102 compares a media profile associated with the user of the vehicle 100 with a media profile associated with a user of another vehicle 202x.

As provided above, the comparison can be performed at the onboard computer system 102, as described primarily herein by way of example, and/or by another device, such as a processor of a personal computing device 122 of the user, an onboard computer system of another vehicle 202x, and the remote server 210.

Acts associated with the comparison of step 306 are described further below in connection with the method 400 of FIG. 4. As provided, the method 300 may repeat or end 307.

XI. METHOD FOR DETERMINING WHETHER PROFILES ARE SUFFICIENTLY SIMILAR

Figure 4:
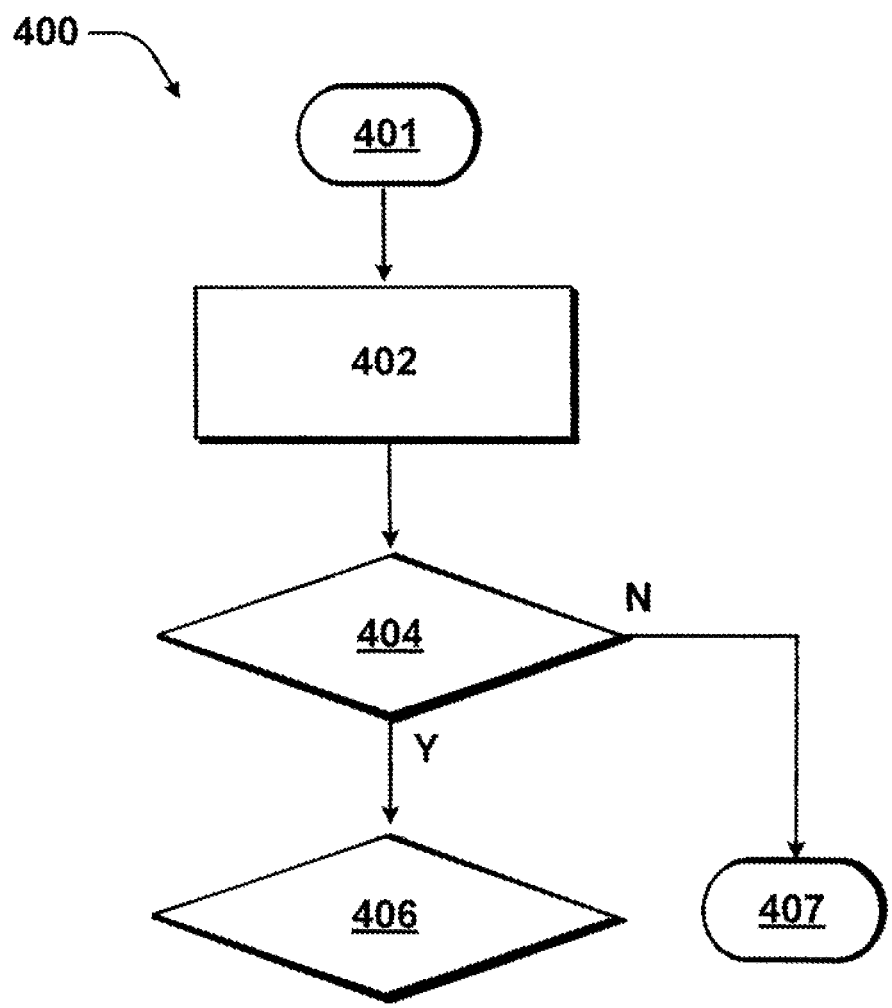

FIG. 4 shows an exemplary method 400 for determining whether two or more media profiles are sufficiently similar so as to warrant generation of recommended media content for at least one of the corresponding two or more users. As provided above, the particular manner in which media profiles are compared depends, in some embodiments, on the particular format of the media profiles being compared. The manners described herein, including use of cosine-similarity analysis, are provided by way of example, and not in a limiting sense. Thus, profiles may be compared in other ways.

It should be understood that the steps of the method 400 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 400 can be ended at any time.

In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 102 of any vehicle 100, 202x, of the remote server 210, or of a personal computing device 122.

The method 400 begins 401 and flow proceeds to step 402, whereat the onboard computer system 102 obtains information representing two or more media profiles to be compared. The onboard computer system 102 may obtain the media profiles in a variety of ways, including by receiving the media profiles from a source external to the vehicle 100.

The system 102 may receive the media profiles in response to the system 102 having requested the media profiles. For instance, the system 102 in some embodiments requests a media profile associated with a user of another vehicle 202x from one of an onboard computer system of the other vehicle 202x and a remoter server 210. The onboard computer system 102 could also obtain a media profile associated with the user from an outside source, such as the remote a server 210 or a personal computing device 122. Whether received from an outside source and/or generated at the onboard computer system 102, the system 102 stores the profile associated with the user of the vehicle 100 in the memory 106 of the vehicle 100. For embodiments in which the onboard computer system 102 compares the user media profile with a profile of another user, the system 102 at least temporarily caches or stores the other profile for access in connection with the comparison.

Communications to and from the vehicle 100 can be made by way of any of the communication systems described herein, including DSRC, IEEE 802.x, WI-FI®, BLUETOOTH®, infrared, IRDA, NFC, or long-range communications. Further, communication may be made via various routes, including vehicle-to-infrastructure (V2I), vehicle-to-pedestrian (V2P) or other vehicle-related (V2X) communications, including various types of ad hoc networks, such as cellular or other mobile ad hoc networks, and long-range communication networks.

Upon obtaining the two or more media profiles to be compared at step 402, flow proceeds to step 404 whereat the media profiles are compared. As provided, in one embodiment, each media profile being compared is represented by a multi-dimensional vector. In this embodiment, the onboard computer system 102 compares the multi-dimensional vectors mathematically, such as by a cosine similarity analysis.

As described above, cosine similarity involves measuring similarity between two vectors by measuring a cosine of an angle separating the vectors. As an example of an analysis using cosine similarity, two vectors are considered, vector $V_i$ and vector $V_j$, being represented follows:

$$\vec{V}_j = [v_j^1, v_j^2, v_j^3 \ldots v_j^m]$$

$$\vec{V}_i = [v_i^1, v_i^2, v_i^3 \ldots v_i^m]$$

A similarity $sim(V_i, V_j)$ between the two vectors $V_i, V_j$ can be calculated as follows:

$$sim(\vec{V}_i, \vec{V}_j) = \cos(\vec{V}_i, \vec{V}_j) = \frac{\vec{V}_i \otimes \vec{V}_j}{\|\vec{V}_i\| \cdot \|\vec{V}_j\|}$$

$$= \frac{\sum_{k=1}^{m} v_i^k v_j^k}{\sqrt{\sum_{k=1}^{m} (v_i^k)^2} \sqrt{\sum_{k=1}^{m} (v_j^k)^2}}$$

In some embodiments, the onboard system 102 is programmed to include a similarity threshold to which the result of the similarity analysis $sim(V_i, V_j)$ is compared. If the result of the similarity analysis $sim(V_i, V_j)$ is less than the threshold, then the onboard computer system 102 considers the vectors $V_i, V_j$ sufficiently similar at step 404, and flow proceeds to step 406. For instance, a similarity threshold can be set so that vectors being compared to each other are considered sufficiently similar if the similarity $sim(V_i, V_j)$ is less than or equal to the similarity threshold. Similarly in this example, if the result of the similarity analysis $sim(V_i, V_j)$ is greater than the mentioned similarity threshold, then the vectors $V_i, V_j$ are considered relatively distinct, and flow proceeds to step 407, whereat the method repeats or ends. As provided above, in some embodiments, the similarity threshold is set so that vectors being compared to each other are considered distinct if the similarity $sim(V_i, V_j)$ is greater than or equal to the threshold.

At step 406, the onboard computer system 102 generates recommended media content using the media profiles found to be sufficiently related at step 404. The acts involved with generating recommended media content are described further below in connection with the method 500 of FIG. 5.

XII. METHOD FOR GENERATING RECOMMENDED MEDIA CONTENT

Figure 5:
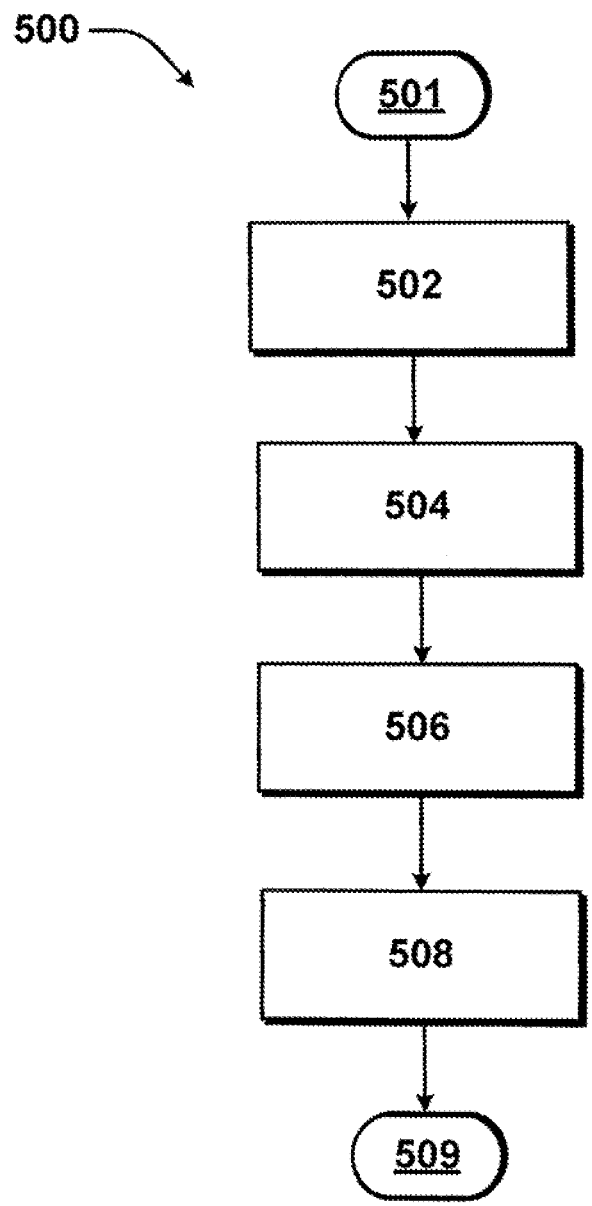
FIG. 5 shows an exemplary method or generating recommended media content based on the similar media profiles.

FIG. 5 shows an exemplary method 500 for generating recommended media content, according to embodiments of the present disclosure. It should be understood that the steps of the method 500 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 102 of any vehicle 100, 202x, of the remote server 210, or of a personal computing device 122.

The method 500 begins 501 and flow proceeds to step 502, whereat the onboard computer system 102, or other computing device described herein (e.g., personal device 122 or remote server 210) identifies media content that is present in both of the matching media profiles. For illustration, the example presented above is used here, wherein media content associated with the user of the first vehicle 100 is represented by a first vector, $V_i$, and media content associated with a second user, of another vehicle 202x, is represented by a second vector, $V_j$. Media content associated with both profiles, and so both vectors, $V_i, V_j$ can be represented as the union of the two vectors, or:

$$V_i \cup V_j$$

At step 504, the computing device (e.g., component 102, 122, 210) determines recommended media content for the user of the vehicle 100. The recommended media content for the first user, assuming the vectors $V_i, V_j$ described, is represented mathematically as the union of the first vector $V_i$ and the second $V_j$, minus the first vector $V_i$ or:

$$V_i \cup V_j - V_i$$

Similarly, at step 506, the computing device generates recommended media content for the second vehicle user (e.g., of vehicle 202x), associated with the second vector, $V_j$, as a union of the first vector $V_i$ and the second $V_j$, minus the second vector $V_j$ or:

$$V_i \cup V_j - V_j$$

Although described and shown separately, any of steps 502, 504, and 506 may be combined into essentially a single act.

Thus, the onboard computer system 102 generates for one or both users, recommended media content that the respective user has not previously been exposed to, or at least media content that was not previously present in the respective user's media profile.

Upon generation of recommended media content as described, flow proceeds to step 508, whereat the media content is implemented, such as by inclusion of the recommended media content into media profiles associated with the users and/or providing the recommended media content to the respective users. Acts associated with implementing the recommended media content is explained further, below, in connection with the method 600 of FIG. 6. The method 500 may be repeated, such as with respect to other users and/or other media profiles, or end 509.

XIII. METHOD FOR IMPLEMENTING RECOMMENDED MEDIA CONTENT

Figure 6:
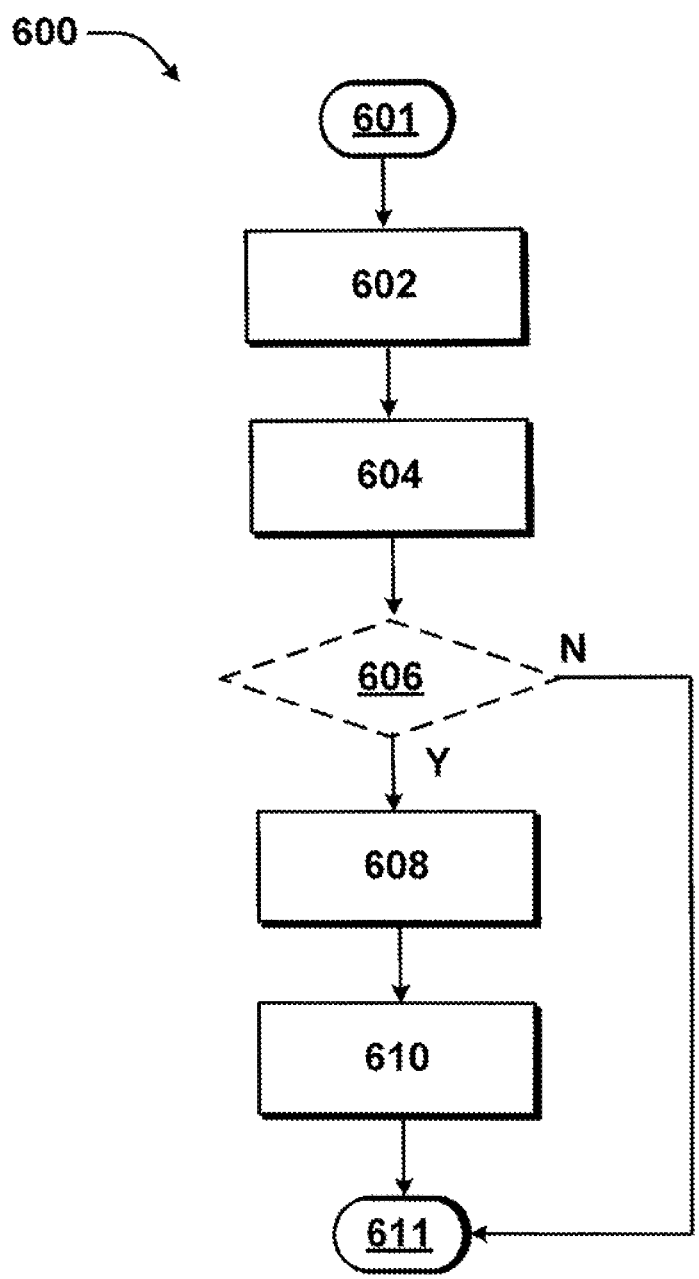
FIG. 6 shows an exemplary method for implementing the generated recommended media content, including updating at least one media profile and initiating provision of the recommended media content to the user.

FIG. 6 shows an exemplary method 600 for generating recommended media content, according to an embodiment of the present disclosure. It should be understood that the steps of the method 600 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 600 can be ended at any time. In certain embodiments, some or all steps of this process, and/or substantially equivalent steps are performed by execution of computer-readable instructions stored or included on a computer-readable medium, for example.

For instance, references to a processor performing functions of the present disclosure refer to any one or more inter-working computing components executing instructions, such as in the form of an algorithm, provided on a computer-readable medium, such as a memory associated with the processor of the onboard computer system 102 of any vehicle 100, 202x, of the remote server 210, or of a personal computing device 122.

The method 600 begins 601 and flow proceeds to step 602, whereat the onboard computer system 102, or other computing device described herein, communicates the recommended media content to one or more devices that can incorporate the media content into the media profiles of the users. For instance, if recommended media content for the user of the vehicle 100 is generated at the vehicle 100, but will be integrated into a user profile at the remote server 210, then the vehicle 100 at step 602 communicates the recommended profile to the remote server 210. As provided, versions of the user's media profile can be maintained at more than one location.

At an optional step 604, according to a contemplated embodiment, the recommended media content for the user of the vehicle 100 is presented to the user for approval by the user of the media content for incorporation into the media profile of the user. The recommended media content may be communicated to the user in a variety of ways, such as by way of the HMI sub-system 120 of the vehicle, which, as provided, can include a display screen and speakers. In a particular contemplated embodiment, the recommended media content is presented to the user for approval by way of a personal computing device 122, such as a smart phone or personal or tablet computer of the user.

At an optional step 606, the onboard computer system 102 determines whether the user has approved the recommended media content. The onboard computer system 102 can be configured to accept a single approval or disapproval for an entire batch of recommended media content (e.g., $V_i \cup V_j - V_j$), or to accept separate approvals/disapprovals for each of distinct components or files of the recommended media content, such as specific songs, videos, or articles.

In these ways, some particular media content of a recommended media content batch can be approved and other particular media content of the same batch can be disapproved. For approved media content, whether it is an entire batch or components thereof, flow proceeds to step 608 of the method 600. With respect to any disapproved media content, whether it be an entire batch or components thereof, flow proceeds to step 611, whereat the method can be repeated, such as in connection with other users and/or media profiles, or end.

In some embodiments, the onboard computer system 102 can, in some embodiments, accept an approval of recommended media content without presenting any or all of the media content to the user. As an example of partial presentation, the onboard computer system 102 could present only a list of titles of recommended media content, and the user can approve or disapprove without further accessing or experiencing the recommended media content. In one case, the user has entered a list of keywords, and the keywords are matched against the recommended content. For instance, keywords could be topics, genres, instruments, other similar artists (e.g., bands), etc.

As provided, the onboard computer system 102 is in some particular embodiments configured to continue beyond step 606, automatically, following generation of the recommended media content for the user of the vehicle 100 or receipt of the recommended media content from another computing device (e.g., from the vehicle 202x or a remote server 210). The onboard computer system 102 is in some embodiments configured to prompt the user for such approval or authorization in any of a variety of ways, including by way of the HMI sub-system 120, described above. The onboard computer system 102 is in some embodiment arranged to allow the user to establish a standing instruction, or user preference, whereby the system 102 is authorized to automatically integrate recommended media for the user into the user's profile 118. The onboard computer system 102 can be configured to receive authorization from the vehicle user by user input in one of a variety of ways, including by the HMI sub-system 120.

At step 608, the onboard computer system 102, or other computing device described herein, integrates recommended media content into the user profile 118. Step 608 can be performed automatically, as provided, or upon receipt of an approval or authorization from the user with respect to a batch of recommended media content or particular media content of a batch.

In one contemplated embodiment, recommended media is provided to the user by way of the remote server 210 and/or a personal computing device 122. The personal computing device 122 or remote server 210 can store the media profile, or a copy of the profile, and update the profile stored on the server 210 or device 122 with the recommended media content.

At step 610, the recommended media content is presented to the user, such as by way of the HMI 120 of the vehicle 100 or a personal computing device 122. At step 609, the method 600 may be repeated, such as in connection with other users and/or other media, or end.

XIV. CONCLUSION

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

All variables described herein, including conditions, events, triggers, settings, preferences, and the like are in various embodiments able to be set by the user. For instance, variables may be set by the user way of a human-to-machine interface, a web site, telephone call to call center personnel and/or an interactive-voice-response (IVR) system, or other such interfaces. In some embodiments, some or all of the variables are pre-set, such as by being set to default levels during manufacture or provision to the subject system(s) and device(s).

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. An onboard computer system, for use in a first vehicle to determine recommended media, comprising:
   a processor;
   a computer-readable storage device operatively connected to the processor and having instructions that, when executed by the processor, cause the processor to perform operations comprising:
      storing, to the storage device, a first-user media profile being configured as a first multi-dimensional vector and indicating media preferences of a user of the first vehicle;
      determining, based on signals received by way of a receiver of the first vehicle, that the first vehicle is encountering a second vehicle;
      receiving, by way of the receiver, a second-user media profile being configured as a second multi-dimensional vector and indicating media preferences of a user of the second vehicle;
      evaluating the first-user media profile and the second-user media profile, including comparing the first multi-dimensional state vector to the second multi-dimensional state vector, to determine whether the first-user media profile and the second-user media profile bear at least a predetermined level of similarity to each other; and
      in response to determining that the first-user media profile and the second-user media profile bear at least the predetermined level of similarity to each other:
         identifying the recommended media based on characteristics of the first-user media profile and characteristics of the second-user media profile; and
         initiating provision of the recommended media, from the onboard computer system to one of the user of the first vehicle and the user of the second vehicle.

2. The onboard computer system of claim 1, wherein the operations further comprise initiating, in response to determining that the first vehicle is encountering a second vehicle, transmission, by way of a transmitter of the first vehicle, to the second vehicle, of a media profile request requesting the second-user media profile.

3. The onboard computer system of claim 1, wherein:
   the operation of identifying the recommended media comprises identifying the recommended media for provision to the user of the second vehicle; and
   the operation of initiating provision of the recommended media comprises initiating transmission of the recommended media, from the onboard computer system, by way of the transmitter, to an onboard computer system of the second vehicle.

4. The onboard computer system of claim 3, wherein the operation of identifying the recommended media for the user of the second vehicle comprises identifying media that is not represented in the second-user media profile.

5. The onboard computer system of claim 1, wherein:
   the operation of identifying the recommended media comprises identifying the recommended media for provision to the user of the first vehicle; and
   the operation of initiating provision of the recommended media comprises initiating provision of the recommended media to the user of the first vehicle by way of a media system of the first vehicle.

6. The onboard computer system of claim 5, wherein the operation of identifying the recommended media for the user of the first vehicle comprises identifying media that is not represented in the first-user media profile.

7. The onboard computer system of claim 1, wherein the operations further comprise developing the first-user media profile using historic actions of the first user.

8. The onboard computer system of claim 1, wherein the operations further comprise receiving the first-user media profile from an external source.

9. The onboard computer system of claim 1, wherein the vehicle is an automobile, and the onboard computer system is a component of the automobile.

10. A method, for recommending information to a user of a vehicle, comprising:
    storing, by a computer of a first vehicle, a first-user media profile in a storage medium of the first vehicle, the first-user media profile being configured as a first multi-dimensional vector and indicating media preferences of a user of the first vehicle;
    determining, by the computer of the first vehicle, by way of the receiver that the first vehicle is encountering a second vehicle based on signals received;
    receiving, by the computer of the first vehicle, from the second vehicle, by way of the receiver, a second-user media profile being configured as a second multi-dimensional vector and indicating media preferences of a user of the second vehicle;
    evaluating the first-user media profile and the second-user media profile, including comparing the first multi-dimensional state vector to the second multi-dimensional state vector, to determine whether the first-user media profile and the second-user media profile bear at least a predetermined level of similarity to each other; and
    in response to determining that the first-user media profile and the second-user media profile bear at least the predetermined level of similarity to each other:
       identifying the recommended media based on characteristics of the first-user media profile and characteristics of the second-user media profile; and
       initiating provision of the recommended media to one of the user of the first vehicle and the user of the second vehicle.

11. The method of claim 10, further comprising initiating, in response to determining that the first vehicle is encountering a second vehicle, transmission, by way of the transmitter, to the second vehicle, of a media profile request requesting the second-user media profile.

12. The method of claim 10, wherein:
    identifying the recommended media includes identifying the recommended media for provision to the user of the second vehicle; and initiating provision of the recommended media includes initiating transmission of the recommended media, from the onboard computer, by way of the transmitter, to an onboard computer system of the second vehicle.

13. The method of claim 12, wherein identifying the recommended media for the user of the second vehicle based on characteristics of the first-user media profile and characteristics of the second-user media profile includes identifying media that is not represented in the second-user media profile.

14. The method of claim 10, wherein:
identifying the recommended media includes identifying the recommended media for provision to the user of the first vehicle; and
initiating provision of the recommended media includes initiating provision of the recommended media to the user of the first vehicle by way of a media system of the first vehicle.

15. The method of claim 14, wherein identifying the recommended media for the user of the first vehicle based on characteristics of the first-user media profile and characteristics of the second-user media profile includes identifying media that is not represented in the first-user media profile.

16. The method of claim 10, wherein:
the first-user media profile is configured as a first multi-dimensional vector;
the second-user media profile is configured as a second multi-dimensional state vector; and
evaluating the first-user media profile and the second-user media profile includes comparing the first multi-dimensional state vector and the second multi-dimensional state vector to each other.

17. A method, for recommending media to a user of a vehicle, comprising:
determining, by a system using a processor, that a first vehicle and a second vehicle are proximate to each other;
obtaining by the system, a first-user media profile, the first-user media profile being configured as a first multi-dimensional vector and indicating media preferences of a user of the first vehicle;
storing, by the system, the first-user media profile in a storage medium;
obtaining, by the system, a second-user media profile being configured as a second multi-dimensional vector indicating media preferences of a user of the second vehicle;
storing, by the system, the second-user media profile in the storage medium;
evaluating the first-user media profile and the second-user media profile, including comparing the first multi-dimensional state vector to the second multi-dimensional state vector, to determine whether the first-user media profile and the second-user media profile bear at least a predetermined level of similarity to each other; and
in response to determining that the first-user media profile and the second-user media profile bear at least the predetermined level of similarity to each other:
identifying the recommended media based on characteristics of the first-user media profile and characteristics of the second-user media profile; and
initiating provision of the recommended media to one of the user of the first vehicle and the user of the second vehicle.

18. The method of claim 17, further comprising:
determining that three or more vehicles, including the first vehicle and the second vehicle, are proximate to each other;
obtaining a user media profile corresponding to respective users of each of the three or more vehicles, including the first-user media profile and the second-user media profile; and
evaluating the user media profiles corresponding to the users of the three or more vehicles to determine whether any of the user media profiles bear at least a predetermined level of similarity to any other of the media profiles.

19. The method of claim 17, wherein (a) identifying the recommended media and (b) initiating provision of the recommended media include at least one of:
(i) (a) identifying first recommended media, for the user of the first vehicle, being media represented by the second-user media profile that is not represented by the first-user media profile and (b) initiating provision of the first recommended media to the user of the first vehicle; and
(ii) (a) identifying second recommended media, for the user of the second vehicle, being media represented by the first-user media profile that is not represented by the second-user media profile and (b) initiating provision of the second recommended media to the user of the second vehicle.

* * * * *